(12) United States Patent
Agata et al.

(10) Patent No.: US 10,209,474 B2
(45) Date of Patent: Feb. 19, 2019

(54) FIBER ARRANGEMENT MEMBER AND OPTICAL WIRING UNIT

(71) Applicant: FUJIKURA LTD., Tokyo (JP)

(72) Inventors: Katsushi Agata, Sakura (JP); Norihiro Momotsu, Sakura (JP); Terutake Kobayashi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/863,372

(22) Filed: Jan. 5, 2018

(65) Prior Publication Data

US 2018/0196214 A1 Jul. 12, 2018

(30) Foreign Application Priority Data

Jan. 10, 2017 (JP) .................. 2017-001736

(51) Int. Cl.
*G02B 6/44* (2006.01)

(52) U.S. Cl.
CPC ......... *G02B 6/4471* (2013.01); *G02B 6/4446* (2013.01)

(58) Field of Classification Search
None
See application file for complete search history.

(56) References Cited

U.S. PATENT DOCUMENTS

| | | | | |
|---|---|---|---|---|
| 5,100,221 A | * | 3/1992 | Carney | G02B 6/4452 385/135 |
| 5,394,502 A | * | 2/1995 | Caron | G02B 6/4473 174/72 A |
| 5,469,893 A | * | 11/1995 | Caveney | H02G 3/0608 138/157 |
| 5,471,555 A | | 11/1995 | Braga et al. | |
| 6,256,443 B1 | | 7/2001 | Uruno et al. | |

(Continued)

FOREIGN PATENT DOCUMENTS

| | | |
|---|---|---|
| JP | 2000-304935 A | 11/2000 |
| JP | 2001-133634 A | 5/2001 |

(Continued)

OTHER PUBLICATIONS

Japanese Industrial Standards, "F04 Type Connectors for Optical Fiber Cables (Type SC Connectors)," JIS C 5973, 2014 (10 pages).

(Continued)

*Primary Examiner* — Michael Stahl
(74) *Attorney, Agent, or Firm* — Osha Liang LLP

(57) ABSTRACT

A fiber arrangement member includes: a tubular housing that houses a plurality of optical fibers; and a plurality of guide portions extending from a first end in an axial direction of the housing toward side areas of the first end. The guide portions extend from the housing in different directions from each other crossing an axial line of the housing. The guide portions comprise guide grooves that house the optical fibers and communicate with an inner space of the housing. The grooves are open at sides of the grooves opposite to a second end in the axial direction of the housing on entire lengths in extending directions of the grooves. The grooves selectively house the optical fibers extended from the first end in the axial direction of the housing. The optical fibers housed in one of the grooves move into another of the grooves.

6 Claims, 6 Drawing Sheets

(56) References Cited

U.S. PATENT DOCUMENTS

| | | | | |
|---|---|---|---|---|
| 2002/0122641 A1* | 9/2002 | Nakaya | ............... | G02B 6/06 385/114 |
| 2005/0129379 A1* | 6/2005 | Reagan | ............... | G02B 6/4452 385/135 |
| 2010/0178015 A1* | 7/2010 | Kadrnoska | ............... | H02G 3/0456 385/100 |
| 2012/0189260 A1* | 7/2012 | Kowalczyk | ............... | G02B 6/44 385/135 |

FOREIGN PATENT DOCUMENTS

| JP | 2005-331692 A | 12/2005 |
|---|---|---|
| JP | 3908188 B2 | 4/2007 |
| JP | 2008-116595 A | 5/2008 |
| JP | 4187775 B2 | 11/2008 |
| JP | 2012-088566 A | 5/2012 |

OTHER PUBLICATIONS

Japanese Industrial Standards, "F14 Type connectors for optical fiber cables (Type MU connector)," JIS C 5983, 2014, with partial translation (64 pages).

Japanese Industrial Standards, "F12 Type Connectors for optical fiber ribbons (MT connectors)," JIS C 5981, 2012, with partial translation (4 pages).

Japanese Industrial Standards, "F13 Type connectors for optical fiber ribbons" JIS C 5982, 1998, with partial translation (22 pages).

Japanese Industrial Standards, "F19 Type Connectors for Optical Fiber Cables" JIS C 5988, 2005, with partial translation (23 pages).

Notice of Allowance issued in corresponding Japanese Application No. 2017-001736 dated Jan. 30, 2018 (3 pages).

Decision to Grant a Patent in a counterpart Japanese Patent Application No. 2018-030089 dated Apr. 17, 2018 (3 pages).

* cited by examiner

FIBER ARRANGEMENT MEMBER AND OPTICAL WIRING UNIT

TECHNICAL FIELD

The present invention relates to a fiber arrangement member and an optical wiring unit.

Priority is claimed on Japanese Patent Application No. 2017-001736, filed Jan. 10, 2017, the content of which is incorporated herein by reference.

BACKGROUND

In the related art, a fiber arrangement member used for guiding a plurality of optical fibers in various directions includes, for example, members disclosed in Patent Document 1 (Japanese Unexamined Patent Application, First Publication No. 2001-133634), Patent Document 2 (Japanese Patent No. 4187775) and Patent Document 3 (Japanese Patent No. 3908188).

A fiber arrangement member (an arrangement element) shown in FIG. 5 of Patent Document 1 includes a jumper cord holder through which an optical fiber (a jumper cord 6 extending from a splitter module 11) passes, a reserved cord holder holding a reserved cord (a non-working cord) of jumper cords that pass through the jumper cord holder, and a working cord holder holding a working cord of the jumper cords.

FIGS. 3 and 4 of Patent Documents 2 and 3 disclose fiber arrangement members (arrangement members) formed in an approximately U-shape and an approximately square frame shape. Each fiber arrangement member is provided with an optical fiber cord-passage port (hereinafter, referred to as an "entrance-side optical fiber cord-passage port") on the entrance side thereof through which an optical fiber (an optical fiber cord 104) passes, and a plurality of optical fiber cord-passage ports (hereinafter, referred to as "exit-side optical fiber cord-passage ports") on the exit side thereof. In the fiber arrangement member, optical fibers passing through the entrance-side optical fiber cord-passage port can be arranged so as to be distributed to the exit-side optical fiber cord-passage ports through the inner space of the U-shaped or square frame-shaped fiber arrangement member.

The fiber arrangement member (the arrangement element) shown in FIG. 5 of Patent Document 1 includes an attachment section (with a reference sign 17) provided with the working cord holder, and a L-shaped cord distribution section (with a reference sign 18) provided with the reserved cord holder. In the fiber arrangement member, the working cord and the reserved cord are arranged so as to be distributed to the working cord holder and to the reserved cord holder respectively through a space (hereinafter, referred to as a "distribution space") between the attachment section and the cord distribution section. However, it is difficult to allow a user's fingers to be inserted into the distribution space, and it is not easy to perform wiring work such as elimination of entanglement of cords in the distribution space. Therefore, in the fiber arrangement member shown in FIG. 5 of Patent Document 1, when optical fibers are changed between the reserved cord holder and the working cord holder, it may take time and effort to eliminate entanglement of the optical fibers.

In the fiber arrangement members (the arrangement members) shown in FIGS. 3 and 4 of Patent Documents 2 and 3, a plurality of optical fibers passing through the entrance-side optical fiber cord-passage port can be arranged so as to be distributed to two exit-side optical fiber cord-passage ports provided apart from the entrance-side optical fiber cord-passage port. However, it is difficult to allow a user's fingers to be inserted into a space (hereinafter, referred to as a "distribution space") between the entrance-side optical fiber cord-passage port and each exit-side optical fiber cord-passage port, and it is not easy to perform work such as elimination of entanglement of the optical fibers in the distribution space. Therefore, in the fiber arrangement members shown in FIGS. 3 and 4 of Patent Documents 2 and 3, when optical fibers are changed between a plurality of exit-side optical fiber cord-passage ports, it may take time and effort to eliminate entanglement of the optical fibers.

SUMMARY

One or more embodiments of the present invention provide a fiber arrangement member and an optical wiring unit using the same, in which at the time the wiring directions of optical fibers are changed, entanglement of the optical fibers can be easily eliminated, and work of changing the wiring directions can be efficiently performed.

In view of the above, a fiber arrangement member according to one or more embodiments includes: a tubular fiber housing configured to house a plurality of optical fibers; and a plurality of fiber guide portions extending from a first end in an axial direction of the fiber housing toward side areas of the first end, the plurality of fiber guide portions extend from the fiber housing in different directions from each other crossing an axial line of the fiber housing, the plurality of fiber guide portions are provided with guide grooves capable of housing the optical fibers and communicating with an inner space of the fiber housing, the guide grooves of the plurality of fiber guide portions are open at sides of the guide grooves opposite to a second end in the axial direction of the fiber housing on entire lengths in extending directions of the guide grooves, and the guide grooves of the plurality of fiber guide portions are configured to allow the optical fibers extended from the first end in the axial direction of the fiber housing to be selectively housed therein and are configured to allow the optical fibers housed in a guide groove to be moved into another guide groove of the guide grooves.

In one or more embodiments of the present invention, the plurality of fiber guide portions are provided with curved walls on the entire lengths in the extending directions of the guide grooves, and the curved walls are configured to curve the optical fibers.

In one or more embodiments of the present invention, the fiber housing is provided with fiber-holding grooves extending in the axial direction of the fiber housing and capable of holding the optical fibers along the axial line.

The fiber arrangement member according to one or more embodiments of the present invention further includes: a branching optical connector connected with a multi-core optical connector provided in an end of a multi-core optical fiber.

In one or more embodiments of the present invention, the fiber housing includes a branching portion-supporting portion supporting a fiber-branching portion in which the plurality of optical fibers are branched from an optical fiber ribbon.

In one or more embodiments of the present invention, an optical wiring unit includes: the fiber arrangement member of one of the first to fifth aspects; an adapter arrangement section to which an optical connector of an end of an optical fiber extending from a fiber guide portion of the fiber arrangement member is connected, and an optical connector-reserving section configured to reserve an optical connector of an end of a connection standby state-optical fiber, which is connected to nothing, of optical fibers extending from a fiber guide portion of the fiber arrangement member.

In one or more embodiments of the present invention, the optical wiring unit further includes: a fiber arrangement member-support member supporting a plurality of fiber arrangement members so as to dispose fiber guide portions of the plurality of fiber arrangement members in a stepwise fashion.

According to the fiber arrangement member and the optical wiring unit of one or more embodiments of the present invention, at the time the wiring directions of optical fibers are changed, entanglement of the optical fibers can be easily eliminated, and work of changing the wiring directions can be efficiently performed.

DETAILED DESCRIPTION OF EMBODIMENTS

Figure 1:
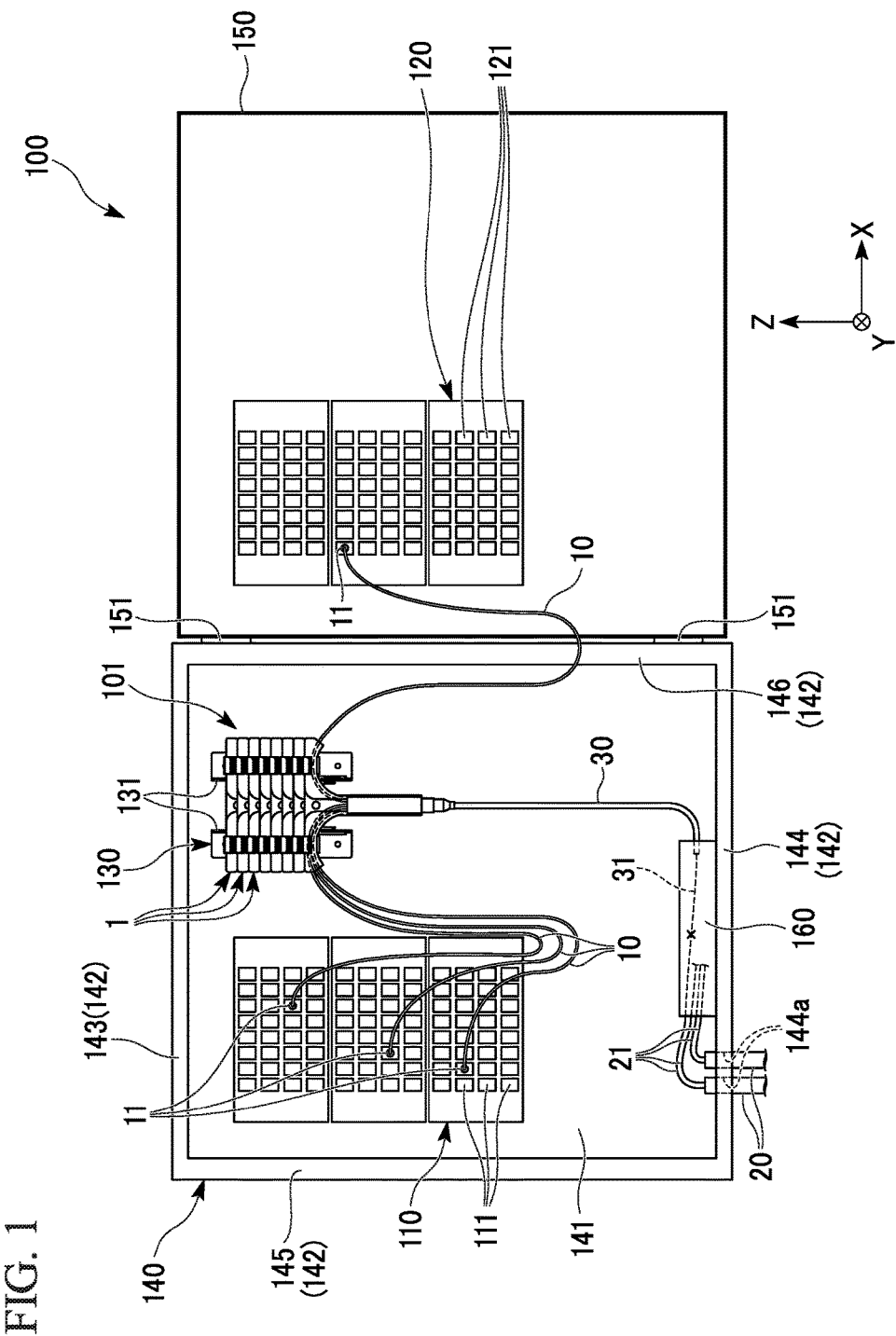
FIG. 1 is a schematic diagram of an optical connection box of one or more embodiments.

Hereinafter, embodiments of the present invention are described with reference to the drawings. In the following description, in order to facilitate understanding, the drawings may be simplified, for example, some of components are appropriately omitted, the shapes thereof are simplified, and the scales thereof are changed. In addition, an XYZ orthogonal coordinate system is set in order to describe positional relationships between components. In the XYZ orthogonal coordinate system, an X-direction is referred to as a left-right direction, a Y-direction is referred to as a front-rear direction, and a Z-direction is referred to as an up-down direction. In the drawings, the side indicated by the arrow X is referred to as the right side of an optical wiring unit described below, the side indicated by the arrow Y is referred to as the rear side thereof, and the side indicated by the arrow Z is referred to as the upper side thereof.

(Optical Wiring Unit Overview)

FIG. 1 shows, as an example of the optical wiring unit, an optical connection box 100 including fiber arrangement members 1 of one or more embodiments. As shown in FIG. 1, the optical connection box 100 includes an adapter arrangement section 110 in which a plurality of optical connector adapters 111 are arranged, a fiber arrangement member unit 101 in which a plurality of fiber arrangement members 1 are supported by a support member 130 (hereinafter, it may be referred to as a "fiber arrangement member-support member 130"), an optical connector-reserving section 120, an enclosure 140 accommodating these components, and a cover 150 capable of opening and closing the front side of the enclosure 140. FIG. 1 shows a state where the front side of the enclosure 140 is open.

(Enclosure)

The enclosure 140 is formed in a rectangular parallelepiped box shape having the open front side. The enclosure 140 includes a rectangular rear plate 141 provided with the adapter arrangement section 110 and the fiber arrangement member-support member 130, and a frame portion 142 formed in a rectangular frame shape and connecting to the outer peripheral edge of the rear plate 141.

The frame portion 142 includes an upper plate 143 having a plate shape elongated in the left-right direction and having a thickness in the up-down direction and connecting to the upper edge of the rear plate 141, a lower plate 144 having the same shape as the upper plate 143 and connecting to the lower edge of the rear plate 141, a left plate 145 having a plate shape elongated in the up-down direction and having a thickness in the left-right direction and connecting to the left edge of the rear plate 141, and a right plate 146 having the same shape as the left plate 145 and connecting to the right edge of the rear plate 141.

The lower plate 144 is provided with a plurality of cable insertion holes 144a into which optical fiber cables 20 are inserted. A tray 160 is placed on the lower plate 144 and houses the connection portion in which optical fibers 21 (hereinafter, referred to as "cable-side optical fibers 21") led out of the optical fiber cables 20 and optical fibers 31 (hereinafter, referred to as "cord-side optical fibers 31") led out of optical fiber cords 30 are connected (optically connected) together.

The cable-side optical fiber 21 and the cord-side optical fiber 31 are optical fiber ribbons whose numbers of cores are the same.

An end of the optical fiber cord 30 (a multi-core optical fiber, a multi-core optical fiber cord) opposite to an end thereof connected to the cable-side optical fiber 21 is provided with an optical connector 35 (a multi-core optical connector, refer to FIG. 4), and the optical connector 35 terminates the cord-side optical fiber 31 such that connector connection can be performed therein. The optical fiber cord 30 optically connected to the cable-side optical fiber 21 may be referred to as a "terminated optical fiber cord 30".

(Cover)

The cover 150 is formed in a rectangular plate shape slightly smaller than the outline of the frame portion 142. The cover 150 is linked to the frame portion 142 through a pair of upper and lower hinges 151. The cover 150 is provided with the optical connector-reserving section 120.

(Adapter Arrangement Section)

The adapter arrangement section 110 is disposed to be close to the upper and left edges of the rear plate 141. Optical connectors 11 provided in ends of optical fibers 10 extended from the fiber arrangement member 1 of the fiber arrangement member unit 101 are removably fitted into the optical connector adapters 111 of the adapter arrangement section 110.

The optical connectors 11 of the ends of the optical fibers 10 are inserted and fitted into the optical connector adapters 111 of the adapter arrangement section 110, whereby the optical fibers 10 extended from the fiber arrangement member 1 are connector connected (optically connected) to other optical fibers (not shown) inside the optical connector adapters 111. In one or more embodiments, the optical connector adapter 111 is a tubular member whose inside is provided with a locking claw (not shown) configured to be removably engaged with the optical connector 11.

Hereinafter, an optical fiber 10 of the optical fibers 10 extended from the fiber arrangement member 1, which is connector connected (optically connected) to another optical fiber (not shown, a communication optical fiber) at the optical connector adapter 111 of the adapter arrangement section 110, may be referred to as a "working optical fiber 10".

In one or more embodiments, the optical fiber 10 is a single-core optical fiber cord containing a single-core coated optical fiber. For the connector 11 of the end of the optical fiber 10, a single-core optical connector is used such as an SC-type optical connector (a product conforming to an F04-type optical connector specified in JIS C 5973 or conforming to IEC 61754-4 (or IEC 60874-14)), an MU-type optical connector (a product conforming to an F14-type optical connector specified in JIS C 5983 or conforming to IEC 61754-6) and the like.

The optical fiber 10 is a jumper cord 10 selectably connectable to other optical fibers (not shown) provided in the optical connector adapters 111 through insertion and removal of the optical connector 11 with respect to the plurality of optical connector adapters 111 of the adapter arrangement section 110. Hereinafter, the optical fiber 10 may be referred to as the "jumper cord 10".

(Optical Connector-Reserving Section)

The optical connector-reserving section 120 is disposed to be close to the upper and left edges of the cover 150. The optical connector-reserving section 120 is disposed in substantially the same height as the adapter arrangement section 110.

The optical connector-reserving section 120 reserves (holds) the optical connecter 11 of the end of the optical fiber 10, which is connector connected (optically connected) to nothing, of the optical fibers 10 extended from the fiber arrangement member 1. Hereinafter, the optical connector 11 reserved in the optical connector-reserving section 120 may be referred to as a "reserved optical connector 11", and the optical fiber 10 whose end is provided with the reserved optical connector 11 may be referred to as a "reserved optical fiber 10". In addition, the reserved optical fiber 10 corresponds to an "connection standby state-optical fiber 10", which is connected to nothing, of the optical fibers 10 extended from a fiber guide portion 50 (refer to FIG. 2) of the fiber arrangement member 1.

The optical connector-reserving section 120 is provided with a plurality of connector-reserving members 121, and each connector-reserving member 121 is fitted with the reserved optical connector 11. The connector-reserving member 121 of FIG. 1 is, similar to the optical connector adapter 111, a tubular member whose inside is provided with a locking claw (not shown) configured to be removably engaged with the optical connector 11.

(Fiber Arrangement Member)

Figure 4:
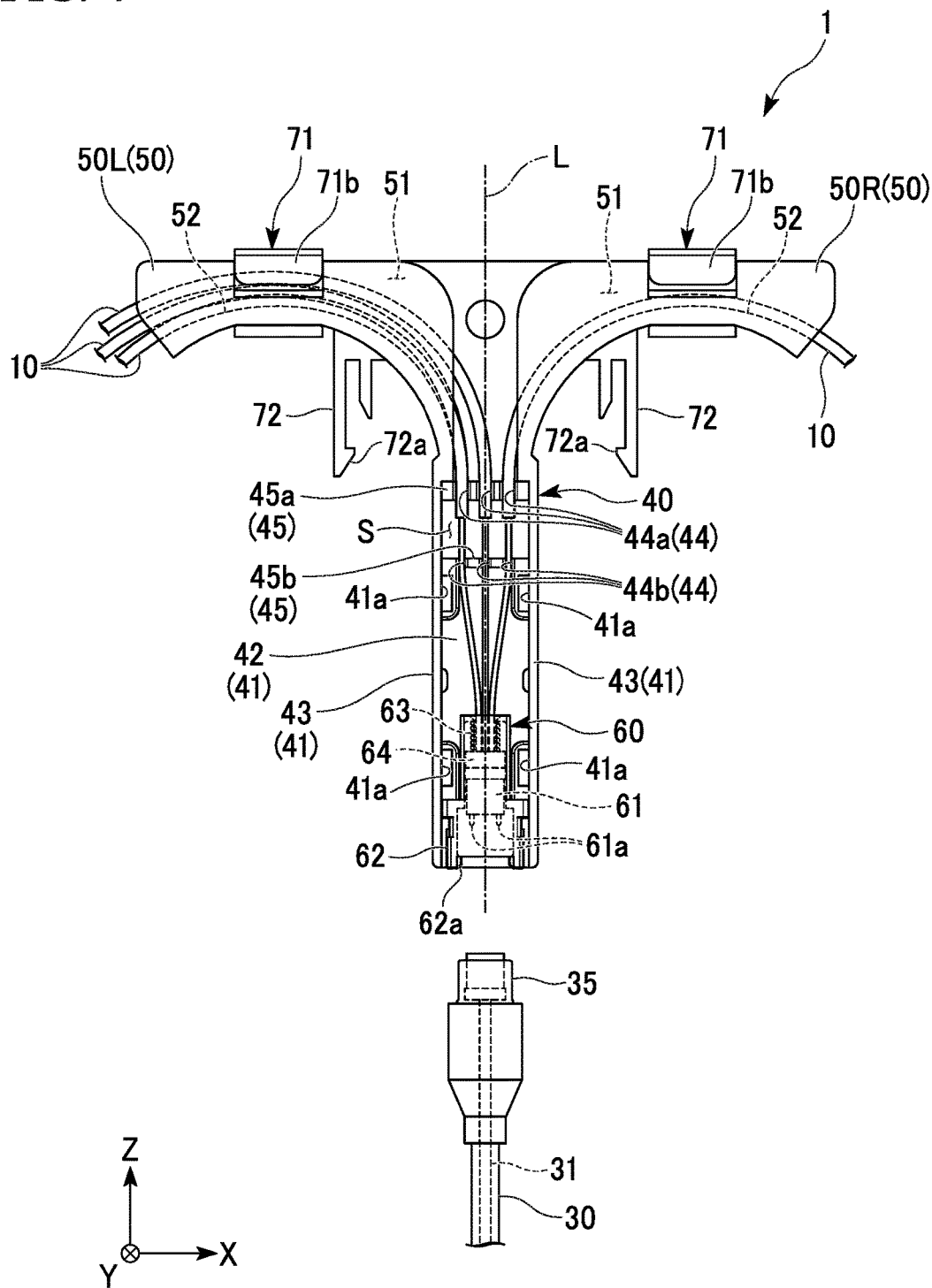
FIG. 4 is a front view showing a state where a cover member of a fiber housing is removed from the fiber arrangement member of FIG. 1.

As shown in FIG. 4, the fiber arrangement member 1 is formed in a T-shape. The fiber arrangement member 1 includes a tubular fiber housing 40 housing a plurality of optical fibers 10, a plurality of fiber guide portions 50 extending from a first end (the upper end) in an axial direction of the fiber housing 40 toward side areas of the first end, and a multi-core optical connector 61 that terminates ends of the optical fibers 10 (the ends being opposite to ends thereof with the optical connectors 11) such that connector connection can be performed therein.

The multi-core optical connector 61 is butt-connected to the optical connector 35 of the end of the terminated optical fiber cord 30, whereby the optical connection between the optical fiber ribbon, which is the cord-side optical fiber 31, and a plurality of single-core optical fibers is obtained. Hereinafter, the multi-core optical connector 61 provided in the fiber housing 40 of the fiber arrangement member 1 may be referred to as a "branching optical connector 61".

(Fiber Housing)

Figure 3:
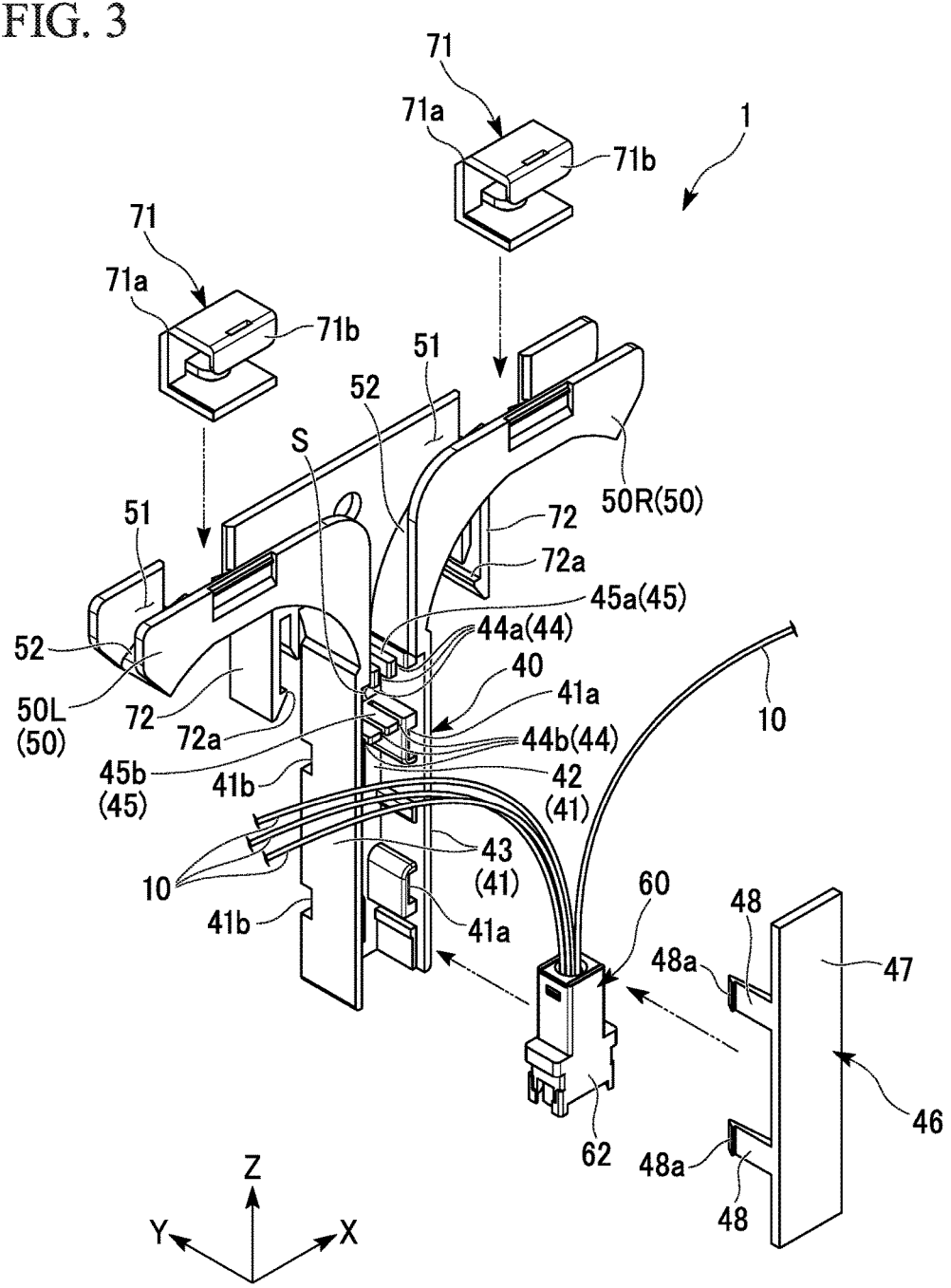
FIG. 3 is an exploded perspective view of the fiber arrangement member of one or more embodiments.

The fiber housing 40 is formed in a tubular shape extending in the up-down direction. As shown in FIG. 3, to be specific, the fiber housing 40 includes a housing main body 41 having the open front side, and a cover member 46 covering the housing main body 41 from the front side of the housing main body 41.

The housing main body 41 includes a rear plate portion 42 having a plate shape elongated in the up-down direction and having a thickness in the front-rear direction, and a pair of left and right side plate portions 43 extending forward from the left and right edges of the rear plate portion 42. Each boundary part between the rear plate portion 42 and the pair of left and right side plate portions 43 is provided with a pair of upper and lower locking holes 41a.

The cover member 46 includes a cover main body 47 having a plate shape elongated in the up-down direction and having a thickness in the front-rear direction, and two pairs of upper and lower extending pieces 48 extending rearward from the cover main body 47. Ends (the rear ends) of the two pairs of upper and lower extending pieces 48 are provided with locking claws 48a configured to be inserted into the two pairs of upper and lower locking holes 41a provided in the housing main body 41 and to be removably engaged with locking sections 41b thereof. The cover member 46 is detachably attached to the housing main body 41 using the two pairs of upper and lower locking claws 48a.

As shown in FIG. 4, the plurality of optical fibers 10 are housed in the fiber housing 40. The fiber housing 40 is provided with fiber-holding grooves 44 extending in the axial direction of the fiber housing 40 and capable of holding the optical fibers 10 along an axial line L. The fiber-holding grooves 44 include upper grooves 44a and lower grooves 44b arranged to be next to each other in the up-down direction in an area close to the first end in the axial direction of the fiber housing 40.

To be specific, the upper grooves 44a and the lower grooves 44b are formed so as to be depressed toward the rear plate portion 42 from the protruding edges (the front edges) of protruding plates 45, and the protruding plates 45 protrude from the rear plate portion 42 of the fiber housing 40 inward of the fiber housing 40. In the drawings, a reference sign 45a represents an upper protruding plate provided with the upper grooves 44a, and a reference sign 45b represents a lower protruding plate provided with the lower grooves 44b.

The upper grooves 44a and the lower grooves 44b lead the optical fibers 10 in the up-down direction and are arranged at intervals in the left-right direction. In one or more embodiments, three upper grooves 44a and three lower grooves 44b are arranged at intervals in the left-right direction. The groove width of the upper groove 44a is greater than that of the lower groove 44b. In other words, the upper groove 44a has a groove width in which the jumper cord 10 (the single-core optical fiber cord) can be held. On the other hand, the lower groove 44b has a groove width in which the single-core coated optical fiber of the jumper cord 10 can be held. The optical fibers 10 expose the single-core coated optical fibers thereof at a portion below the upper grooves 44a.

(Branching Optical Connector)

The branching optical connector 61 is disposed in a lower portion of the fiber housing 40. The branching optical connector 61 is provided at ends (the lower ends) of the single-core coated optical fibers extending downward from the lower grooves 44b. In one or more embodiments, the branching optical connector 61 functions as a branching portion in which the optical fiber ribbon is branched into a plurality (four, in the drawings) of single-core coated optical fibers. To be specific, an MT-type optical connector (a product conforming to an F12-type optical connector specified in JIS C 5981 or conforming to IEC 61754-5) is used for the branching optical connector 61 of FIG. 4.

The branching optical connector 61 is provided with a pair of guide pins 61a, which are inserted and fitted into guide-pin holes (not shown) provided in the optical connector 35 of the end of the terminated optical fiber cord 30.

Hereinafter, the optical connector 35 of the end of the terminated optical fiber cord 30 of FIG. 4 may be referred to as a "multi-core cord terminated connector 35". The multi-core cord terminated connector 35 of FIG. 4 is an MPO-type optical connector (a product conforming to an F13-type optical connector specified in JIS C 5982 or conforming to IEC 61754-7).

The branching optical connector 61 is housed in a housing 62 (hereinafter, it may be referred to as a "receptacle housing 62") into which the multi-core cord terminated connector 35 (the MPO-type optical connector, in the drawings) is inserted and fitted. The branching optical connector 61 and the housing 62 housing the branching optical connector 61 configure an optical connector receptacle 60 allowing the multi-core cord terminated connector 35 to be inserted and fitted thereinto. The branching optical connector 61 functions as a ferrule of the optical connector receptacle 60. The branching optical connector 61 is disposed on a far side of a connector-fitting recess inside the receptacle housing 62 when viewed from an opening 62a of the connector-fitting recess.

The optical connector receptacle 60 is housed in the fiber housing 40. The optical connector receptacle 60 is fixed to and integrated with the fiber housing 40 through walls (for example, walls forming the locking holes 41a) of the fiber housing 40 positioned around the optical connector receptacle 60. The multi-core cord terminated connector 35 is inserted into the connector-fitting recess of the receptacle housing 62 through the opening 62a so as to be fitted into the receptacle housing 62 and is butt-connected to the branching optical connector 61.

The optical connector receptacle 60 further includes a spring 63 and a pin clamp 64. The spring 63 resiliently pushes the branching optical connector 61 and provides butting force for the branching optical connector 61 and the multi-core cord terminated connector 35 butt-connected to the branching optical connector 61. The guide pins 61a are fixed to the pin clamp 64. The spring 63 and the pin clamp 64 are disposed on the upper side of the branching optical connector 61 opposite to the connection end surface for the butt-connection of the lower end of the branching optical connector 61 so as to be housed in the receptacle housing 62. The pin clamp 64 is fixed to the proximal ends of the guide pins 61a opposite to the distal ends thereof protruding from the branching optical connector 61 toward the connection end surface. The spring 63 is disposed above the pin clamp 64 and resiliently pushes the branching optical connector 61 through the pin clamp 64.

The single-core coated optical fibers of the jumper cords 10 are extended from the upper end surface of the branching optical connector 61 through an opening (not shown) of the upper end portion of the receptacle housing 62 toward the upper side of the fiber housing 40 opposite to the opening 62a of the connector-fitting recess of the receptacle housing 62.

In addition, the multi-core cord terminated connector 35 is not limited to the MPO-type optical connector, but an MTRJ-type optical connector (a product conforming to an F19-type optical connector specified in JIS C 5988 or conforming to IEC 61754-18) can also be employed therefor.

(Fiber Guide Portion)

The plurality of fiber guide portions 50 extend from the fiber housing 40 in different directions from each other crossing the axial line L of the fiber housing 40. In one or more embodiments, the plurality (two) of fiber guide portions 50 extend from the first end (the upper end) in the axial direction of the fiber housing 40 toward left and right areas of the first end.

As shown in FIG. 3, each of the plurality of fiber guide portions 50 is provided with a guide groove 51 capable of housing the optical fibers 10 and communicating with an inner space S of the fiber housing 40. The guide grooves 51 of the plurality of fiber guide portions 50 are open at sides (the upper sides) thereof opposite to a second end in the axial direction of the fiber housing 40 on the entire lengths in the extending directions of the guide grooves 51. That is, the guide grooves 51 of the plurality of fiber guide portions 50 are open upward (in the same direction).

Since the guide grooves 51 of the plurality of fiber guide portions 50 are open in the same direction, the guide grooves 51 of the plurality of fiber guide portions 50 are configured to allow the optical fibers 10 extended from the first end in the axial direction of the fiber housing 40 to be selectively housed therein. In addition, the guide grooves 51 are configured to allow the optical fibers 10 housed in a guide groove 51 to be moved into another guide groove 51.

In one or more embodiments, an optical fiber 10 housed in the guide groove 51 of a left-side fiber guide portion 50L heads for the adapter arrangement section 110 (refer to FIG. 1). That is, the optical fiber 10 housed in the guide groove 51 of the left-side fiber guide portion 50L functions as the working optical fiber 10.

On the other hand, an optical fiber 10 housed in the guide groove 51 of a right-side fiber guide portion 50R heads for the optical connector-reserving section 120 (refer to FIG. 1). That is, the optical fiber 10 housed in the guide groove 51 of the right-side fiber guide portion 50R functions as the reserved optical fiber 10.

The drawings show that three optical fibers 10 are housed in the guide groove 51 of the left-side fiber guide portion 50L, and one optical fiber 10 is housed in the guide groove 51 of the right-side fiber guide portion 50R.

Each of the plurality of fiber guide portions 50 is provided with a curved wall 52 on the entire length in the extending direction of the guide groove 51, and the curved wall 52 is configured to curve the optical fiber 10. The curved wall 52 has a circular arc shape protruding upward and having a large curvature. Ends of the curved walls 52 connect to side walls of the left and right upper grooves 44a. In the front view of FIG. 4, the curved walls 52 include first portions and second portions, the first portions are gently curved so as to extend from the side walls of the left and right upper grooves 44a outward in the left-right direction as it goes upward, and the second portions are gently curved so as to extend from the first portions outward in the left-right direction as it goes downward.

In the drawings, reference signs 71 represent a pair of left and right catcher members covering side surfaces of the optical fibers 10 housed in the guide grooves 51, and reference signs 72 represent a pair of left and right locking portions including locking claws 72a and used for locking the fiber arrangement member 1 on the fiber arrangement member-support member 130. For example, the catcher member 71 is detachably attached to the fiber guide portion 50 through a locking piece 71b capable of tilting based on a hinge 71a.

(Fiber Arrangement Member-Support Member)

Figure 2:
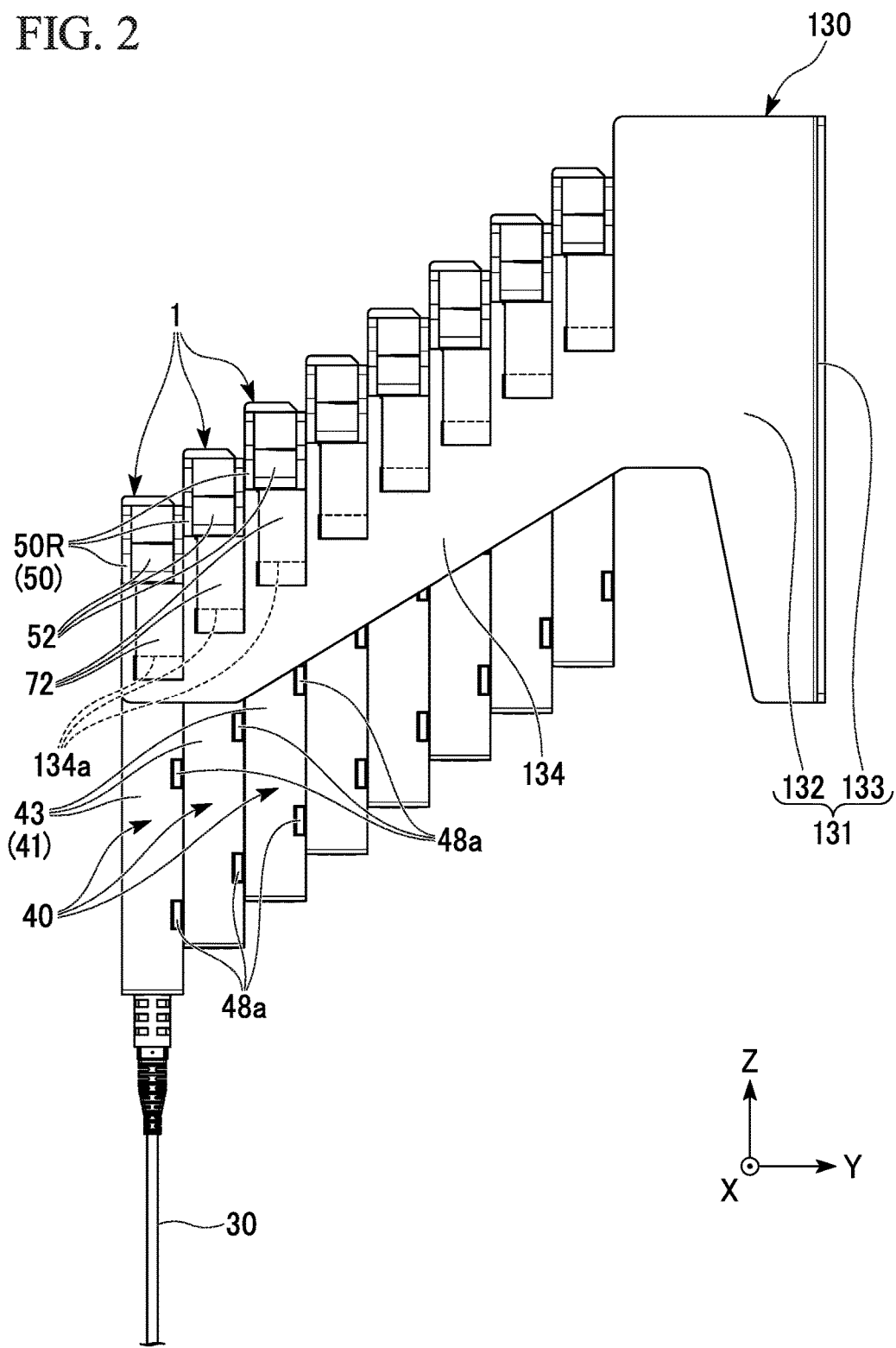
FIG. 2 is a side view showing a held state of a plurality of fiber arrangement members of one or more embodiments.

As shown in FIG. 1, the fiber arrangement member-support member 130 is disposed to be close to the upper and right edges of the rear plate 141. The fiber arrangement member-support member 130 is disposed between the adapter arrangement section 110 and the optical connector-reserving section 120. As shown in FIG. 2, the fiber arrangement member-support member 130 holds the plurality of fiber arrangement members 1 so as to arrange the fiber guide portions 50 of the plurality of fiber arrangement members 1 in a stepwise fashion.

The fiber arrangement member-support member 130 includes a pair of left and right holding walls 131 holding the plurality of fiber arrangement members 1. Each of the pair of left and right holding walls 131 includes a holding wall main body 132 holding the fiber arrangement members 1, and a connection wall 133 connecting the holding wall main body 132 and the rear plate 141.

In the side view of FIG. 2, the holding wall main body 132 includes an inclined wall 134 inclined forward as it goes downward. The inclined wall 134 is provided with a plurality of insertion holes 134a into which the locking claws 72a (refer to FIG. 3) of the fiber arrangement members 1 are inserted.

The connection wall 133 is formed in a rectangular plate shape elongated in the up-down direction and having a thickness in the front-rear direction and connects to the rear end of the holding wall main body 132. For example, the connection wall 133 is fastened to the rear plate 141 of the enclosure 140 using fastening members (not shown) such as bolts.

As described above, the fiber arrangement member 1 of one or more of the above embodiments includes the tubular fiber housing 40 housing the plurality of optical fibers 10, and the plurality of fiber guide portions 50 extending from the first end in the axial direction of the fiber housing 40 toward side areas of the first end. The plurality of fiber guide portions 50 extend from the fiber housing 40 in different directions from each other crossing the axial line L of the fiber housing 40. The plurality of fiber guide portions 50 are provided with the guide grooves 51 capable of housing the optical fibers 10 and communicating with the inner space S of the fiber housing 40. The guide grooves 51 of the plurality of fiber guide portions 50 are open at sides of the guide grooves 51 opposite to the second end in the axial direction of the fiber housing 40 on the entire lengths in the extending directions of the guide grooves 51. The guide grooves 51 of the plurality of fiber guide portions 50 are configured to allow the optical fibers 10 extended from the first end in the axial direction of the fiber housing 40 to be selectively housed therein and are configured to allow the optical fibers 10 housed in a guide groove 51 to be moved into another guide groove 51.

According to this configuration, since the guide grooves 51 of the plurality of fiber guide portions 50 are open at sides of the guide grooves 51 opposite to the second end in the axial direction of the fiber housing 40 on the entire lengths in the extending directions of the guide grooves 51, compared to a case where the guide grooves 51 of the plurality of fiber guide portions 50 are open in different directions from each other, at the time the optical fibers 10 extended from the first end in the axial direction of the fiber housing 40 are selectively housed in the guide grooves 51 of the plurality of fiber guide portions 50, the arrangement work of the optical fibers 10 becomes easy. In addition, at the time the optical fibers 10 housed in a guide groove 51 are moved to another guide groove 51, the arrangement work of the optical fibers 10 becomes easy. To be specific, when viewed from the opening side of the guide grooves 51, the entire guide grooves 51 can be viewed, and a user's fingers can be easily inserted into the entire guide grooves 51. Therefore, it is possible to easily eliminate entanglement of the optical fibers 10 when the wiring directions of the optical fibers 10 are changed, and to efficiently perform work of changing the wiring directions. Furthermore, it is possible to prevent damage to the optical fibers 10.

The plurality of fiber guide portions 50 are provided with the curved walls 52 on the entire lengths in the extending directions of the guide grooves 51, and the curved walls 52 are configured to curve the optical fibers 10. Accordingly, since the optical fiber 10 extends along the curved wall 52 when the optical fiber 10 is housed in the guide groove 51, it is possible to prevent the optical fiber 10 from sharply bending.

Since the curved wall 52 has a gently circular arc shape protruding upward, the optical fiber 10 can bend along the curved wall 52 due to the optical fiber 10's own weight.

Since the curved walls 52 are gently curved so as to extend from the side walls of the left and right upper grooves 44a outward in the left-right direction as it goes upward, the optical fibers 10 can also be curved at positions of the guide grooves 51 close to the fiber housing 40, and it is possible to prevent local bending of the optical fiber 10, which may damage the optical fiber 10 (may affect the optical transmission characteristics of the optical fiber 10).

Since the fiber housing 40 is provided with the fiber-holding grooves 44 extending in the axial direction of the fiber housing 40 and capable of holding the optical fibers 10 along the axial line, the optical fibers 10 can be directly distributed from the fiber-holding grooves 44 to the guide grooves 51, and thus the workability of arrangement of the optical fibers 10 can be further improved.

Since the branching optical connector 61 connected with the multi-core optical connector 35 is further provided therein, the multi-core optical connector 35 can be configured to be attached to and detached from the fiber arrangement member 1. In addition, the multi-core optical connector 35 and the branching optical connector 61 are connected together, whereby the connection between the multi-core fiber and the single-core fibers can be easily performed.

Since the optical connection box 100 of one or more of the above embodiments includes the fiber arrangement member 1, the adapter arrangement section 110 to which the optical connectors 11 of the ends of the working optical fibers 10 extending from the fiber guide portion 50 of the fiber arrangement member 1 are connected, and the optical connector-reserving section 120 reserving the reserved optical connectors 11 of the ends of the reserved optical fibers 10 extending from the fiber guide portion 50 of the fiber arrangement member 1, the workability at the time the optical fibers 10 are arranged can be improved.

Since the fiber arrangement member-support member 130, which holds the plurality of fiber arrangement members 1 so as to dispose the fiber guide portions 50 of the plurality of fiber arrangement members 1 in a stepwise fashion, is further provided therein, a user can easily access the fiber guide portions 50 of the plurality of fiber arrangement members 1, whereby in a configuration in which the plurality of fiber arrangement members 1 are provided, it is possible to easily eliminate entanglement of the optical fibers 10 when the wiring directions of the optical fibers 10 are changed and to efficiently perform the work of changing the wiring directions.

(Modification)

Hereinafter, a modification is described.

In the above one or more embodiments, an example with the fiber arrangement member-support member 130, which supports a plurality of fiber arrangement members 1 so as to dispose guide portions of the plurality of fiber arrangement members 1 in a stepwise fashion, is described, but the present invention is not limited thereto.

Figure 5:
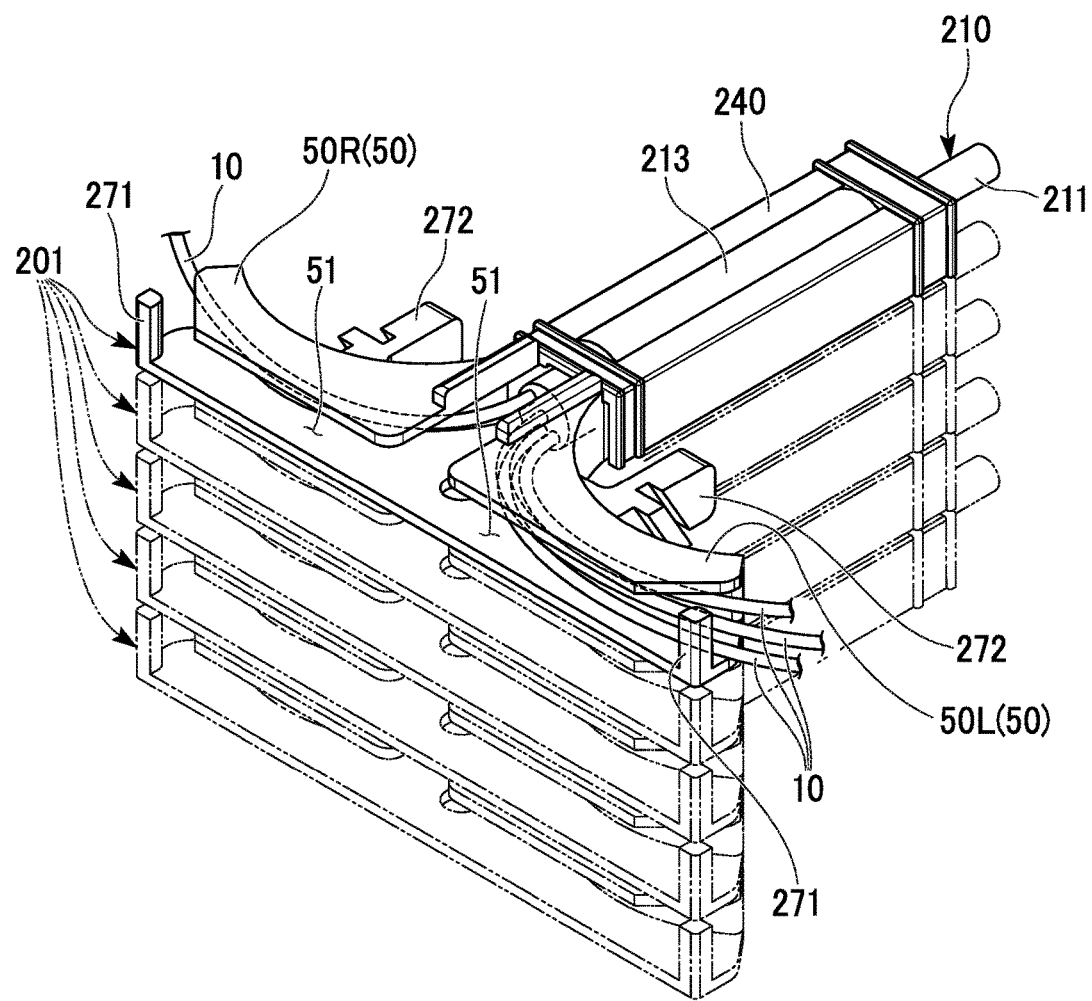
FIG. 5 is a perspective view of fiber arrangement members of a modification of one or more embodiments.
Figure 6:
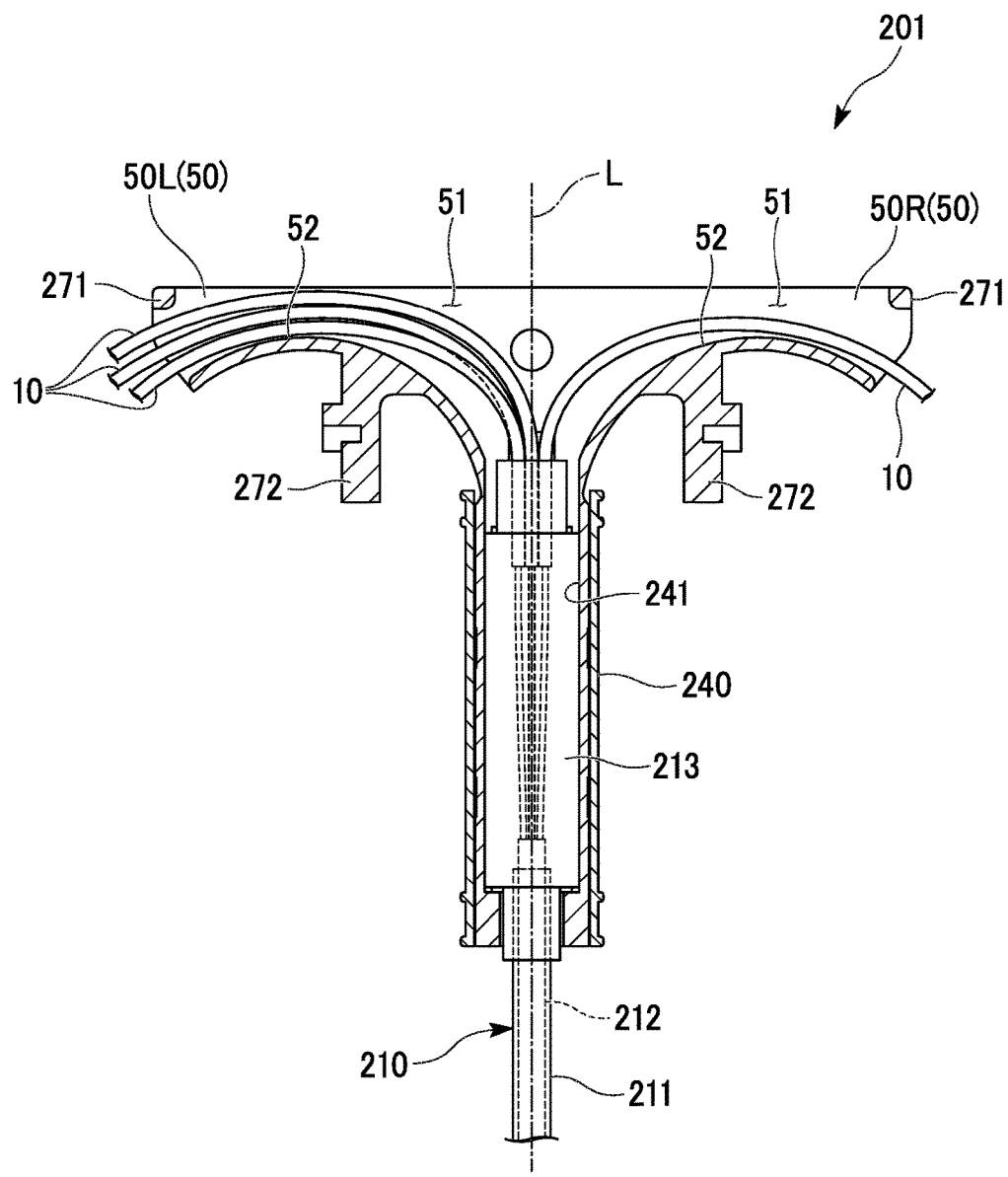
FIG. 6 is a diagram showing a branching portion-support portion of the modification of one or more embodiments.

In FIGS. 5 and 6 used for the following description, the same components of this modification as those of the above embodiments are given the same reference signs, and duplicate descriptions are omitted.

As shown in FIG. 5, a plurality of fiber arrangement members 201 may be piled in the up-down direction.

FIG. 5 shows that five fiber arrangement members 201 are piled in the up-down direction.

In the above one or more embodiments, an example in which the fiber housing 40 is provided with the fiber-holding grooves 44 extending in the axial direction of the fiber housing 40 and capable of holding the optical fibers 10 along the axial line L is described, but the present invention is not limited thereto. For example, as shown in FIG. 6, in the fiber arrangement member 201, a fiber housing 240 may include a branching portion-supporting portion 241 supporting a fiber-branching portion 213 in which a plurality of optical fibers 10 are branched from an optical fiber ribbon 212.

The fiber-branching portion 213 of this modification has a structure in which the branching section of a plurality of optical fibers from the optical fiber ribbon 212 is covered with a resin protective material. The exterior of the fiber-branching portion 213 is formed in a bar shape. As shown in FIG. 5, the fiber housing 240 is formed in a cylindrical shape (a square-cylindrical shape, in the drawing). The bar-shaped fiber-branching portion 213 is housed in the fiber housing 240 such that the axial direction of the fiber-branching portion 213 is parallel to that of the fiber housing 240. As shown in FIG. 6, the branching portion-supporting portion 241 is a wall positioned around the fiber-branching portion 213 of the fiber housing 240. The branching portion-supporting portion 241 supports the fiber-branching portion 213 in a state where the axial direction of the fiber-branching portion 213 is parallel to that of the fiber housing 240.

According to this configuration, the fiber-branching portion 213 of, for example, a fan-out cord 210 can be removably housed in the branching portion-supporting portion 241 and can be attached to the fiber arrangement member 201. The fan-out cord 210 has a structure in which a plurality of single-core optical fiber cords 10 (optical fibers) are branched from an end in the extending direction of a multi-core optical fiber cord 211 (a multi-core optical fiber) containing the optical fiber ribbon 212. In addition, the fan-out cord 210 includes the fiber-branching portion 213 having a structure in which the branching section of a plurality of single-core coated optical fibers from the optical fiber ribbon 212 of the multi-core optical fiber cord 211 is covered with a resin protective material. The multi-core optical fiber cord 211 is extended from a first end in the axial direction of the fiber-branching portion 213. The plurality of single-core optical fiber cords 10 are extended from a second end in the axial direction of the fiber-branching portion 213.

FIGS. 5 and 6 show the fiber arrangement member 201 in a state where the fiber-branching portion 213 of the fan-out cord 210 is housed in the branching portion-supporting portion 241. In FIGS. 5 and 6, the multi-core optical fiber cord 211 of the fan-out cord 210 is extended from an end of the fiber housing 240 opposite to the fiber guide portions 50. The plurality (four, in the drawings) of single-core optical fiber cords 10 of the fan-out cord 210 are extended to the guide grooves 51 of the fiber guide portions 50 from the end of the fiber housing 240 close to the fiber guide portions 50.

In the drawings, reference signs 271 represent a pair of left and right catcher protrusions limiting upward movement of the optical fibers 10 housed in the guide grooves 51, and reference signs 272 represent a pair of left and right locking portions used for locking the fiber arrangement member 201 on a fiber arrangement member-support member (not shown).

In the optical connection box 10, an optical termination box, a closure or the like can be adopted.

In the above one or more embodiments, an example in which the optical wiring unit is the optical connection box 100 is described, but the present invention is not limited thereto. For example, the optical wiring unit may be an optical fiber-wiring frame such as an optical wiring board.

In the above one or more embodiments, an example in which the optical connector 11 of the end of the working optical fiber 10 is connector connected to the communication optical fiber at the adapter arrangement section 110, but the present invention is not limited thereto. For example, a configuration can be adopted in which an optical fiber extended from a fiber guide portion of a fiber arrangement member is connector connected, at the adapter arrangement section 110, to another optical fiber into which test light is led from an optical line test device.

In one or more embodiments, a band member such as a cable band may be provided instead of the catcher member 71.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A fiber arrangement member, comprising:
   a tubular housing that houses a plurality of optical fibers; and
   a plurality of guide portions extending from a first end in an axial direction of the housing toward side areas of the first end, wherein:
   the guide portions extend from the housing in different directions from each other crossing an axial line of the housing,
   the guide portions comprise guide grooves that house the optical fibers and communicate with an inner space of the housing,
   the guide grooves are open at sides of the guide grooves opposite to a second end in the axial direction of the housing on entire lengths in extending directions of the guide grooves,
   the guide grooves selectively house the optical fibers extended from the first end in the axial direction of the housing,
   the optical fibers housed in one of the guide grooves can be moved into another of the guide grooves, and
   the housing comprises fiber-holding grooves extending in the axial direction of the housing and that hold the optical fibers along the axial line.

2. The fiber arrangement member according to claim 1, wherein
the guide portions comprise curved walls on the entire lengths in the extending directions of the guide grooves, and the curved walls cause the optical fibers to curve.

3. The fiber arrangement member according to claim 1, further comprising:
a branching optical connector connected with a multi-core optical connector provided in an end of a multi-core optical fiber.

4. The fiber arrangement member according to claim 1, wherein
the housing comprises a branching portion-supporting portion supporting a fiber-branching portion in which the optical fibers are branched from an optical fiber ribbon.

5. An optical wiring unit, comprising:
a fiber arrangement member, comprising;
   a tubular housing that houses a plurality of optical fibers; and
   a plurality of guide portions extending from a first end in an axial direction of the housing toward side areas of the first end, wherein
      the guide portions extend from the housing in different directions from each other crossing an axial line of the housing,
      the guide portions comprise guide grooves that house the optical fibers and communicate with an inner space of the housing,
      the guide grooves are open at sides of the guide grooves opposite to a second end in the axial direction of the housing on entire lengths in extending directions of the guide grooves,
      the guide grooves selectively house the optical fibers extended from the first end in the axial direction of the housing, and
      the optical fibers housed in one of the guide grooves can be moved into another of the guide grooves;
an adapter arrangement section to which an optical connector of an end of one of the optical fibers extending from one of the guide portions of the fiber arrangement member is connected; and
an optical connector-reserving section that reserves an optical connector of an end of a connection standby state-optical fiber, which is connected to nothing, of the optical fibers extending from one of the guide portions of the fiber arrangement member.

6. The optical wiring unit according to claim 5, further comprising:
a fiber arrangement member-support member supporting a plurality of fiber arrangement members so as to dispose the guide portions of the fiber arrangement members in a stepwise fashion.

* * * * *